United States Patent Office 2,945,885
Patented July 19, 1960

2,945,885

CYCLO-OCTANONE OXIME HYDROCHLORIDES WHICH ARE LIQUID AT ROOM TEMPERATURE, AND A PROCESS FOR THEIR PRODUCTION

Otto von Schickh and Horst Metzger, Ludwigshafen (Rhine), Germany, assignors to Badische Anilin- & Soda-Fabrik Aktiengesellschaft, Ludwigshafen (Rhine), Germany No Drawing. Filed Aug. 29, 1958, Ser. No. 757,932

Claims priority, application Germany Sept. 3, 1957

7 Claims. (Cl. 260—566)

This invention relates to new oxime hydrochlorides which are liquid at room temperature and to a process for their production. It relates especially to new cyclo-octanone oxime hydrochlorides which contain more than 1 mol of hydrogen chloride combined per mol of oxime and which are liquid at ordinary temperature, and also to a new process for the production of these compounds.

It is already known that cyclo-octanone oxime forms with hydrogen chloride a cyclo-octanone oxime hydrochloride which is crystalline at room temperature (cf. B88, 1900 (1955)).

We have now found that cyclo-octanone oxime hydrochlorides which are liquid at room temperature (i.e. 15° to 25° C.) and which contain 1.4 to 2 mols of hydrogen chloride per mol of oxime in combined form are obtained when cyclo-octanone oxime in the fused condition or dissolved in the end product is treated with hydrogen chloride until 1.4 to 2 mols of hydrogen chloride per mol of oxime have been absorbed.

The reaction may be carried out for example by leading into a melt of cyclo-octanone oxime, gaseous hydrogen chloride, if desired diluted for example with indifferent gases, such as nitrogen, air or hydrogen, in the ratio of 1 mol of HCl to 0.1 to 10 mol. Any working temperature can be chosen which is above the melting point of the free oxime and below the decomposition temperature of the oxime hydrochloride, i.e. working in this case is in a temperature range between 42° and about 100° C. It is suitable to work slightly above the melting point of the oxime, i.e. slightly higher than 42° C. It is sufficient if the oxime is melted at the beginning, for example by heating to about 45° C., because during the reaction at least up to the absorption of somewhat more than 1 mol of hydrogen chloride, for example 1.1 to 1.3 mols, heat is set free to the extent that the reaction mixture no longer solidifies. In the further action of hydrogen chloride, for example up to the absorption of about 2 mols of hydrogen chloride per mol of oxime, it is without considerable importance if the reaction temperature falls, by reason of the fact that in the further reaction the heat is set free only slowly, to below the fusion temperature of the free cyclo-octanone oxime, or is lowered by cooling, for example to room temperature, because a solidification of the reaction mixture can no longer take place in the liquid oxime hydrochloride already formed. If cyclo-octanone oxime dissolved in the end product is the starting material for the reaction with hydrogen chloride, i.e. if there is used cyclo-octanone oxime dissolved in cyclo-octanone oxime hydrochlorides which contain combined therein 1.4 to 2 mols of hydrogen chloride per 1 mol of cyclo-octanone oxime, i.e. if the dissolution is effected during the leading in of hydrogen chloride or a mixture of the same with an inert diluent gas, by introduction of solid or fused free cyclo-octanone oxime into cyclo-octanone oxime hydrochloride liquid at room temperature which has already been formed, the reaction can be carried out at temperatures lying below the melting point of the free oxime, for example at temperatures between 20° and 40° C. Temperatures up to 100° C. may however also be used in this case. When working with oxime dissolved in the end product, it is preferable to use solutions which contain about 3 to 40% by weight of free oxime with reference to the amount of the liquid oxime hydrochloride available. For the reaction it is sufficient to introduce the hydrogen chloride in the amount calculated for the formation of an oxime hydrochloride with 1.4 to 2 mols of HCl per mol of oxime. Larger amounts of hydrogen chloride than correspond to the amounts theoretically necessary may be used if it is desired to obtain a cyclo-octanone oxime hydrochloride with 2 or at least almost 2 mols of combined hydrogen chloride per mol of oxime, because the reaction mixture will in practice not absorb more hydrogen chloride than is necessary for the conversion of the cyclo-octanone oxime or its oxime hydrochloride with less than 2 mols of combined hydrogen chloride into the cyclo-octanone oxime hydrochloride with 2 mols of combined hydrogen chloride per mol of oxime.

The reaction may be carried out at atmospheric pressure or also at increased pressure, for example at pressures of 2 to 50 atmospheres. When working under increased pressure it is preferable to work in pressure vessels which are lined with indifferent materials, as for example silver, tantalum or polymeric fluorinated hydrocarbons.

The process may be carried out either discontinuously or continuously.

The cyclo-octanone oxime hydrochlorides liquid at room temperature thus obtained contain 1.4 to 2 mols of hydrogen chloride per mol of oxime. They are new compounds which have not yet been described in the literature. They are suitable to a special extent for the rearrangement of the same into eta-caprylic lactam and are therefore valuable for the production of plastics and synthetic fibers.

As compared with the use of free cyclo-octanone oxime or the crystallized cyclo-octanone oxime hydrochloride with 1 mol of hydrogen chloride per mol of oxime for rearrangement into eta-caprylic lactam, the new liquid cyclo-octanone oxime hydrochlorides which contain 1.4 to 2 mols of hydrogen chloride in combination for each mol of oxime have the advantage of a considerably easier temperautre control during the rearrangement because by the disengagement of hydrogen chloride from the liquid oxime hydrochlorides with sulfuric acid, a large part of the amount of heat set free during the formation of the lactam is withdrawn from the reaction mixture during the rearrangement.

The following examples will further illustrate this invention but the invention is not restricted to these examples. The parts specified in the examples are parts by weight.

Example 1

Hydrogen chloride is led at an initial temperature of 45° C. into 140 parts of fused cyclo-octanone oxime while stirring. The temperature thereby rises slowly to about 80° C. and then falls again to about 30° C. After 65 parts of hydrogen chloride have been absorbed, the introduction is stopped. 205 parts of a cyclo-octanone oxime hydrochloride which is liquid at room temperature are obtained which contains 31.5% by weight of hydrogen chloride and corresponds to the formula $C_8H_{14}NOH \cdot 1.8HCl$.

If the reaction is carried out under the same conditions but the introduction of hydrogen chloride is discontinued after the absorption of 36.5 parts, the reaction mixture solidifies on cooling to form cyclo-octanone oxime monohydrochloride ($C_8H_{14}NOH \cdot HCl$) of the melting point 83° C. (melting point after recrystallization from ethyl acetate 85° C). The hydrogen chloride content amounts to 21.0% by weight (calculated 20.6%).

*Example 2*

140 parts of fused cyclo-octanone oxime are added a little at a time at about 45° C. while stirring to 80 parts of cyclo-octanone oxime hydrochloride (31.5% by weight of HCl) which is liquid at room temperature, and at the same time hydrogen chloride is led through the reaction mixture. Care is taken by gentle cooling that the reaction temperature is kept at about 45° C. After 65 parts of hydrogen chloride have been absorbed, the introduction of the same is discontinued. 285 parts of a cyclo-octanone oxime hydrochloride which is liquid at room temperature are obtained which contains 31.5% by weight of hydrogen chloride.

*Example 3*

140 parts of cyclo-octanone oxime are added a little at a time to 80 parts of cyclo-octanone oxime hydrochloride liquid at room temperature and containing 30% by weight of combined hydrogen chloride, while stirring at about 35° C. and at the same time gaseous hydrogen chloride is led through the mixture. Care is taken by gentle cooling that the reaction temperature amounts to about 35° to 40° C. After the absorption of 50 parts of hydrogen chloride, the introduction of the same is discontinued. There are obtained 270 parts of a cyclo-octanone oxime hydrochloride which is liquid at room temperature, which contains 27% by weight of hydrogen chloride and which corresponds to the formula

$C_8H_{14}NOH \cdot 1.4HCl$

*Example 4*

Gaseous hydrogen chloride is led in the manner described in Example 1 into 211 parts of cyclo-octanone oxime which has been heated to 45° C., while stirring. The temperature initially rises to about 80° C. and falls again to about 30° C. as the introduction is continued. The introduction is discontinued as soon as the reaction mixture shows an increase in weight of 106 parts. 317 parts of a liquid cyclo-octanone oxime hydrochloride are obtained which, according to analysis, contains 33.4% by weight of hydrogen chloride and corresponds to the empirical formula $C_8H_{15}NO \cdot 1.94HCl$.

225 parts of the liquid cyclo-octanone oxime hydrochloride which have been obtained as above described are allowed to flow while stirring into a solution, preheated to about 120° C. of 30 parts of eta-caprylic lactam in 60 parts of 100% sulfuric acid. At the same time, 225 parts of 100% sulfuric acid are added. The supply of the reactants is regulated so that the reaction temperature remains between about 115° and 125° C. After the end of the reaction, the whole is allowed to cool and the reaction mixture is poured onto ice and the mixture neutralized with 50% caustic soda solution to a pH value of 7 to 8. The crude lactam deposited is separated and distilled. After distilling off the water in vacuo, there are obtained at a boiling point, at 0.4 mm. Hg, of 114° to 116° C., 166 parts of practically colorless eta-caprylic lactam of the melting point 75° C. The yield amounts to 91% of the theory.

100 parts of eta-caprylic lactam and 5 parts of omega-aminocaprylic lactam are charged into a glass bomb tube. After the air in the tube has been completely replaced by nitrogen, the reaction mixture is melted in the tube and it is then heated at 260° C. for 8 hours. A melt is obtained which on cooling solidifies to a colorless polyamide of the melting point 195° C. The K-value of the polyamide in concentrated sulfuric acid, measured in known manner, amounts to 70.

We claim:

1. A cyclo-octanone oxime hydrochloride which is liquid at room temperature and in which from 1.4 to 2 mols of hydrogen chloride are combined with each mol of oxime, said cyclo-octanone oxime hydrochloride being prepared by introducing hydrogen chloride at a temperature of about 20° C. to 100° C. into a liquid reaction medium consisting essentially of cyclo-octanone oxime and its oxime-hydrogen chloride reaction products until at least 1.4 mols up to about 2 mols of hydrogen chloride have been absorbed for each mol of cyclo-octanone oxime.

2. A process for the production of a cyclo-octanone oxime hydrochloride which is liquid at room temperature and in which from 1.4 to 2 mols of hydrogen chloride are combined with each mol of oxime, which comprises introducing hydrogen chloride at a temperature of about 20° to 100° C. into a liquid reaction medium consisting essentially of cyclo-octanone oxime and its oxime-hydrogen chloride reaction products until at least 1.4 mols up to about 2 mols of hydrogen chloride have been absorbed for each mol of cyclo-octanone oxime.

3. A process as claimed in claim 2 wherein gaseous hydrogen chloride being introduced into the liquid reaction medium is diluted with an inert gas selected from the group consisting of nitrogen, air and hydrogen.

4. A process as claimed in claim 2 wherein the initial liquid reaction medium is molten cyclo-octanone oxime maintained at a temperature above its melting point and below about 100° C.

5. A process for the production of a cyclo-octanone oxime hydrochloride which is liquid at room temperature and in which 1.4 to 2 mols of hydrogen chloride are combined with each mol of oxime, which comprises introducing hydrogen chloride at a temperature of about 20° to 100° C. into a solution of cyclooctanone oxime dissolved in a liquid cyclo-octanone oxime hydrochloride having 1.4 to 2 mols of hydrogen chloride combined with each mol of oxime until at least 1.4 mols up to about 2 mols of hydrogen chloride have been absorbed for each mol of the cyclo-octanone oxime.

6. A process as claimed in claim 5 wherein the temperature of the solution of cyclo-octanone oxime in cyclo-octanone oxime hydrochloride is between about 20° and 40° C.

7. A process as claimed in claim 5 wherein the solution contains about 3 to 40% by weight of dissolved cyclo-octanone oxime.

References Cited in the file of this patent

UNITED STATES PATENTS 2,797,216     Wagner et al.     June 25, 1957

OTHER REFERENCES

Muller et al.: Berichte der Deutch. Chem. Gesell, vol. 88, p. 1900 (1955).

Germany, B36,738 IVb/12(o), Oct. 31, 1956.